US010227150B2

(12) United States Patent
Trebbi (10) Patent No.: US 10,227,150 B2
(45) Date of Patent: Mar. 12, 2019

(54) TRANSFER APPARATUS AND CORRESPONDING TRANSFER METHOD

(71) Applicant: I.M.A. INDUSTRIA MACCHINE AUTOMATICHE S.P.A., Ozzano Dell'Emilia (IT)

(72) Inventor: Claudio Trebbi, Medicina (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 535 days.

(21) Appl. No.: 14/780,509

(22) PCT Filed: Mar. 26, 2014

(86) PCT No.: PCT/EP2014/056070
§ 371 (c)(1),
(2) Date: Sep. 25, 2015

(87) PCT Pub. No.: WO2014/154754
PCT Pub. Date: Oct. 2, 2014

(65) Prior Publication Data
US 2016/0039549 A1 Feb. 11, 2016

(30) Foreign Application Priority Data

Mar. 27, 2013 (IT) .............................. MI2013A0465

(51) Int. Cl.
*B65B 21/04* (2006.01)
*B65B 21/08* (2006.01)
(Continued)

(52) U.S. Cl.
CPC .............. *B65B 21/04* (2013.01); *B65B 5/106* (2013.01); *B65B 5/108* (2013.01); *B65B 21/08* (2013.01);
(Continued)

(58) Field of Classification Search
CPC ......... B65B 21/04; B65B 5/106; B65B 5/108; B65B 21/08; B65G 33/04; B65G 47/082; B65G 47/642; B65G 2201/0244
(Continued)

(56) References Cited

U.S. PATENT DOCUMENTS 3,512,333 A * 5/1970 Mobley ................... B65B 5/106
414/795.3
5,737,898 A * 4/1998 Grimm ................... B65B 21/04
198/459.6
(Continued)

FOREIGN PATENT DOCUMENTS

DE 15 86 147 A1 6/1970

OTHER PUBLICATIONS

Search Report and Written Opinion for PCT/EP2014/056070, dated Jun. 4, 2014.

*Primary Examiner* — Sameh Tawfik
(74) *Attorney, Agent, or Firm* — Marshall, Gerstein & Borun LLP (57) ABSTRACT

Apparatus to transfer bottles in a container, said apparatus comprising at least a transfer device to transfer the bottles in a first direction and a pick-up and delivery member configured to transfer the bottles from the transfer device to the container. The transfer device and the pick-up and delivery member are disposed consecutive with respect to each other and are of the metering screw type. The pick-up and delivery member is associated to movement means provided to translate the pick-up and delivery member and bring it from a first pick-up condition to a second delivery condition, and vice versa, in a second direction, transverse to the first direction.

17 Claims, 5 Drawing Sheets

(51) Int. Cl.
*B65G 33/04* (2006.01)
*B65B 5/10* (2006.01)
*B65G 47/08* (2006.01)
*B65G 47/64* (2006.01)

(52) U.S. Cl.
CPC ........... *B65G 33/04* (2013.01); *B65G 47/082* (2013.01); *B65G 47/642* (2013.01); *B65G 2201/0244* (2013.01)

(58) Field of Classification Search
USPC .......................................................... 53/475
See application file for complete search history.

(56) References Cited

U.S. PATENT DOCUMENTS

| | | | | |
|---|---|---|---|---|
| 5,909,815 A * | 6/1999 | Kato | ................. | B07B 13/04 209/651 |
| 5,929,387 A * | 7/1999 | Inglin | ................. | G01G 15/00 141/83 |
| 7,284,577 B2 * | 10/2007 | Yoneda | ................. | B65G 33/04 141/129 |
| 7,343,696 B2 * | 3/2008 | Covert | ................. | F26B 5/06 34/92 |
| 7,695,230 B2 * | 4/2010 | Selch | ................. | B65G 1/0435 34/236 |
| 9,546,818 B2 * | 1/2017 | Trebbi | ................. | F26B 5/06 |
| 2008/0053039 A1 * | 3/2008 | Vissers | ................. | B65B 5/06 53/247 |

* cited by examiner fig. 1 fig. 2 fig. 3 fig. 4 fig. 5 fig. 6 fig. 7 fig. 8 fig. 9

TRANSFER APPARATUS AND CORRESPONDING TRANSFER METHOD

FIELD OF THE INVENTION

The present invention concerns a transfer apparatus to transfer bottles or jars inside containers, in an organized manner.

The present invention also concerns the method for transferring the bottles into the container, and the containers thus filled.

BACKGROUND OF THE INVENTION

It is known that distribution houses, for example pharmaceutical houses, that distribute products for the person or for animals, use containers inside which jars or bottles are disposed, all containing the same product.

Hereafter, the term bottles shall include jars or other similar or comparable types of receptacles, or jars or bottles irrespective of the content and of the closing and/or sealing system.

One problem is to maximize the use of the space available in a container used to contain the bottles, which has a support plane and three lateral compartmental walls, while one side is open.

Another problem is to introduce into the container a precise and controlled number of bottles.

At present it is known to fill the containers manually, with high labor costs, or mechanically, even if with current systems the problems described above have not been solved.

For example, an apparatus is known that comprises a conveyor belt that consecutively transports a certain number of bottles toward a transfer zone where there is a thruster.

When, in the transfer zone, there is a certain number of bottles to be inserted into the container, the thruster thrusts the bottles into the container. In this case, the container has at least one support plane and three containing sides. When the thruster is not able to insert other bottles into the container because the container is full, the container is removed and closed.

Although this system is quite effective, it causes the bottles to be introduced into the container randomly, so one cannot be certain either that the space is used optimally or that the desired number of bottles have been introduced.

Another transfer apparatus is also known, comprising pick-up devices to pick up the bottles in organized rows in order to reposition them in the container.

These pick-up devices use suckers or grippers, which act in the upper part of the bottles to pick them up and subsequently deposit them in the desired position in the container.

Although it allows to obtain an acceptable saturation of the spaces and guarantees the desired number of bottles per container, this transfer apparatus is complex, takes a long time to set up and transfer, entails dangers of breaking the bottles and in any case does not guarantee an optimized saturation of the container.

One purpose of the present invention is to obtain a safe transfer apparatus, relatively simple, which requires little maintenance and is easily programmable.

Another purpose of the present invention is to obtain a transfer apparatus that guarantees maximum possible saturation of the spaces with every type and size of container, which does not entail danger of breakages, which is fast, reliable and easily set up.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to the invention, containers are used that have a loading plane and three lateral containing walls associated with the loading plane to define between them an at least partly closed containing compartment.

The invention provides that the bottles are fed with a metering screw transfer device, which transports the bottles in sequence and makes them available sequentially to a pick-up and delivery member.

The pick-up and delivery member, also the metering screw type, receives the bottles from the metering screw device and then positions them in the container.

According to one form of embodiment of the invention, the pick-up and delivery member delivers "n" bottles into the container each time, the following time "n−1" bottles, then again "n" bottles and so on, so that the second group of bottles is disposed in the interspaces between the bottles of the group previously delivered.

According to one form of embodiment, the pick-up and delivery member, disposed consecutive to the metering screw transfer device, is associated with movement means provided to move the pick-up and delivery member and determine the transfer of the groups of bottles into the container.

According to a variant, an alignment device, such as a horizontally mobile barrier, cooperates with the container. The barrier is provided to keep the bottles transferred into the container aligned with each other.

According to one form of embodiment, the mobile barrier is associated with a holding device that maintains the reciprocal positioning of the mobile barrier with respect to the bottles in the container every time a new group of bottles is fed. When the container is full, the mobile barrier is removed and the container is possibly closed.

According to another variant, the transfer apparatus can work two or more containers in sequence so that, when one container is full and during the time it is being closed, the pick-up and delivery member can work on the other container.

According to another variant, the apparatus comprises a containing barrier able to be selectively activated/de-activated. The containing barrier cooperates with the pick-up and delivery member to keep the bottles in the desired position and to allow them to be subsequently transferred.

Another variant of the invention provides that the container is located on a vertically mobile plane so that, when a first layer of bottles has been filled and a separator has possibly been put in the first layer, it is possible to load one or more further layers.

The spirit of the invention also provides that the container is located on a turntable device so that, when one container is full, the turntable device takes it to a subsequent station while it is preparing an empty container to be subsequently filled.

In the variant where two containers are loaded in sequence, they are positioned opposite the pick-up and delivery member.

In this variant, keeping only one feed screw, the pick-up and delivery member moves to receive the bottles on one side and the other side depending on the container it has to feed.

According to the invention, the pick-up and delivery member can only take one row of bottles into the container, so that the subsequent row thrusts the previous row or rows. In this case, in correspondence with the parallel sides of the entrance mouth of the container, the pick-up and delivery member according to a variant has circumferential hollows or grooves suitable to allow the pick-up and delivery member to transfer the row of bottles onto the plane of the container.

According to another variant, the pick-up and delivery member is suitable to enter inside the container, thrusting the bottles for the desired and/or necessary segment inside the container. In this variant, the pick-up and delivery member cooperates with means which support it and position it and which, when the bottles are received by the metering screw transfer device, supply motion to the pick-up and delivery member.

BRIEF DESCRIPTION OF THE DRAWINGS

These and other characteristics of the present invention will become apparent from the following description of some forms of embodiment, given as a non-restrictive example with reference to the attached drawings wherein.

To facilitate comprehension, the same reference numbers have been used, where possible, to identify identical common elements in the drawings. It is understood that elements and characteristics of one form of embodiment can conveniently be incorporated into other forms of embodiment without further clarifications.

DETAILED DESCRIPTION OF SOME FORMS OF EMBODIMENT

Figure 1:
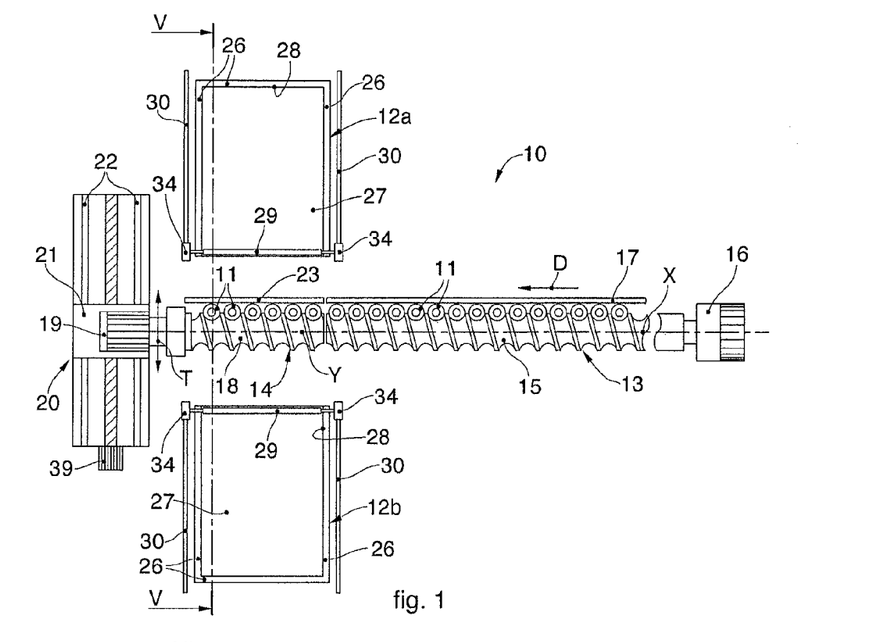
FIG. 1 is a schematic view from above of a transfer apparatus according to the present invention in a first operating condition.
Figure 2:
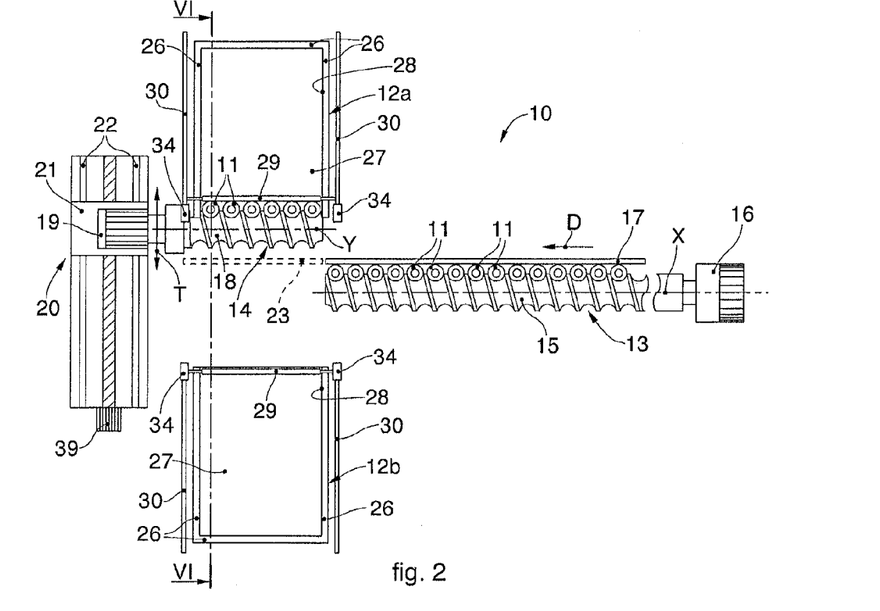
FIG. 2 is a schematic view from above of the transfer apparatus in a second operating condition.

With reference to FIG. 1, a transfer apparatus configured to transfer and deliver bottles 11 to at least one container, in the case shown here two opposite containers 12a and 12b, in an organized manner, is indicated in its entirety by the reference number 10.

The transfer apparatus 10 is provided to fill containers 12a and 12b having at least three consecutive lateral walls 26 and a loading plane 27 defining with the lateral walls 26 a containing compartment 28, open at both top and front.

The transfer apparatus 10 comprises a transfer device 13 of the metering screw type, indicated hereafter as first metering screw, configured to move the bottles 11 on a support plane 25 (FIG. 5), in a first direction D (FIG. 1), and toward a pick-up and delivery member 14, also of the metering screw type, indicated hereafter as second metering screw.

The first metering screw 13 is mounted in a fixed position, and in a generally known manner comprises a first worm screw 15 and a first drive member 16 provided to make the first worm screw 15 rotate around its first axis of rotation X.

The first metering screw 13 also comprises a divider 17 disposed parallel to the first axis of rotation X and defining with the first worm screw 15 a guide channel to feed the bottles 11.

In the case of FIG. 1, the second metering screw 14 is disposed consecutive to the first metering screw 13, that is, it receives the bottles 11 from the latter, in an organized manner, to subsequently deliver them to the container 12a. The second metering screw 14 is suitable both to feed the bottles 11 in the first direction D and also to translate them into the container 12a in a second direction T, transverse to the first direction D.

More specifically, the second metering screw 14 is suitable to assume a first pick-up position in which it receives the bottles 11 from the first metering screw 13 with the side cooperating with the container 12a.

Figure 3:
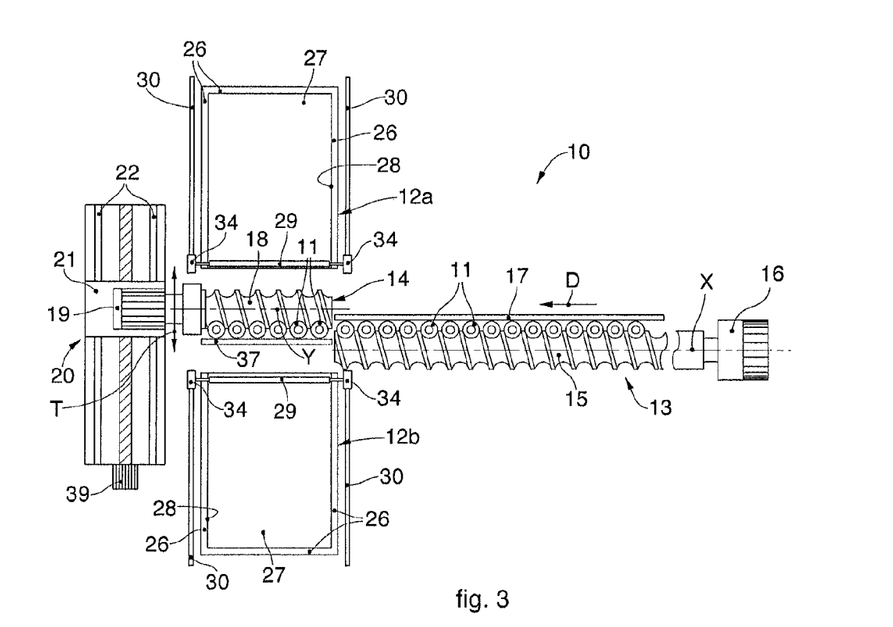
FIG. 3 is a schematic view from above of the transfer apparatus in a third operating condition.
Figure 4:
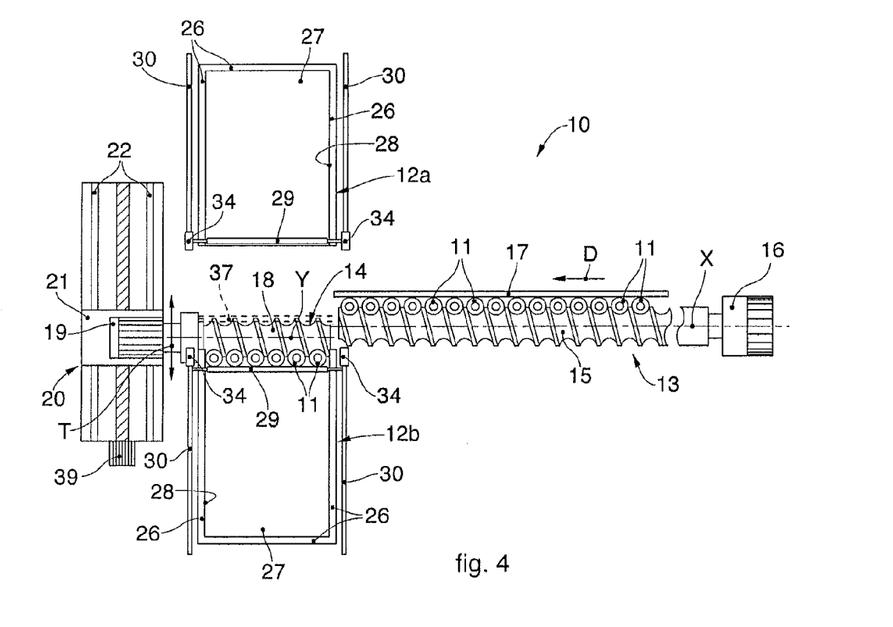
FIG. 4 is a schematic view from above of the transfer apparatus in a fourth operating condition.

The second metering screw 14, in the case shown in FIG. 3, is also suitable in its first position or condition to receive the bottles 11 from the first metering screw 13 with the side cooperating with the container 12b. In both conditions, the second metering screw 14 can assume a second delivery condition of the bottles 11 into the respective container 12a or 12b in which the second metering screw 14 is translated in the second direction T with respect to the first condition and toward the respective container 12a or 12b.

The second metering screw 14 comprises a second worm screw 18 associated with a second drive member 19 provided to make the latter rotate around a second axis of rotation Y, parallel or substantially coaxial to the first axis of rotation X. Some forms of embodiment may provide that the second drive member 19 is selectively associable to the second worm screw 18 only in the condition where it is suitable to make the bottles 11 advance in the first direction D.

Both the first worm screw 15 and the second worm screw 18 have a threading profile shaped so as to have concavities of a shape mating with the external surface of the bottles 11, and to allow the latter to be transferred.

Movement means 20 are associated with the second metering screw 14 to translate the latter in the second direction T and to make the second metering screw 14 assume its first or second condition. The movement means 20 in this case comprise guides 22 disposed transverse to the second axis of rotation Y and on which a slider 21 is mounted sliding, to support the second worm screw 18. Actuation means 39 are provided to act on the slider 21 and to determine its sliding along the guides 22.

According to one form of embodiment, it can be provided that the containers 12a and 12b are filled by feeding rows of bottles 11 alternatively first into the container 12a and then into the other container 12b until they are completely full. It is not excluded that, in other forms of embodiment, the bottles 11 can be loaded in other ways.

Figure 5:
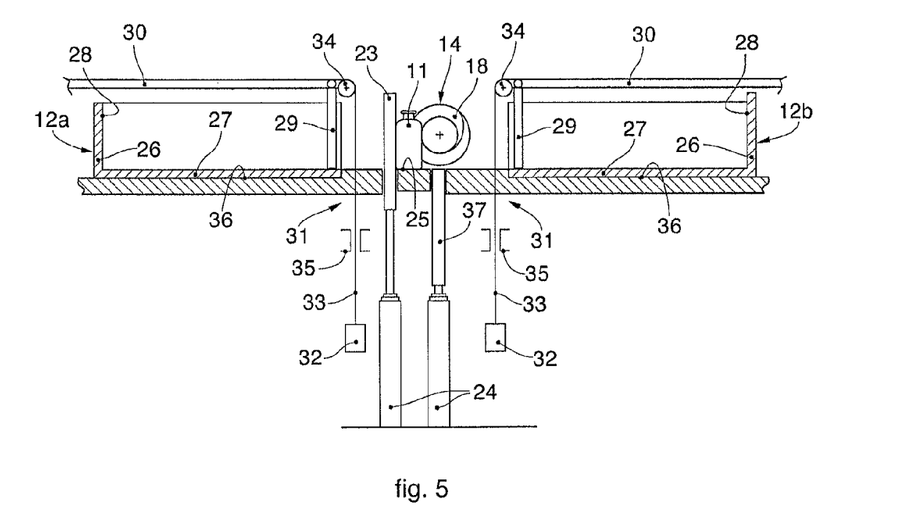
FIG. 5 is a schematic lateral view in section from V to V of FIG. 1.
Figure 6:
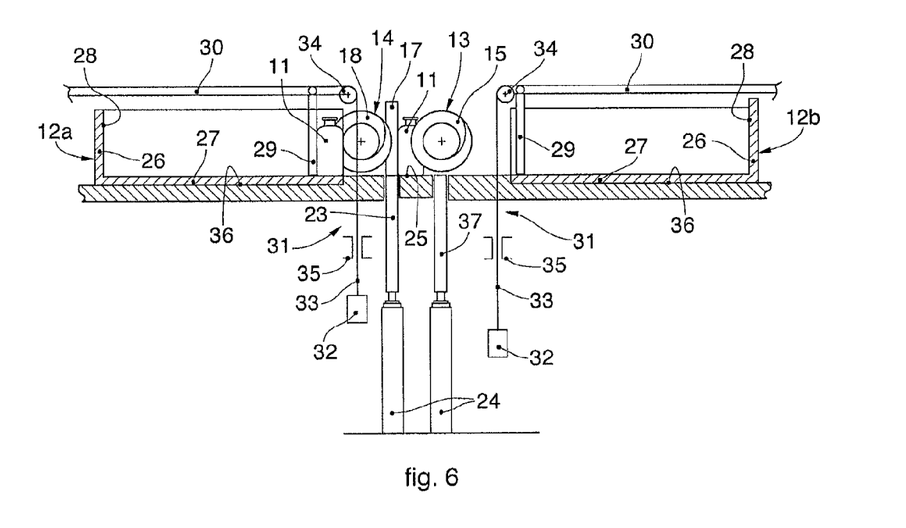
FIG. 6 is a schematic lateral view in section from VI to VI of FIG. 2.

The second metering screw 14 cooperates during use with at least one barrier, in the case shown in FIGS. 5 and 6 two containing barriers 23 and 37 defining with the second worm screw 18 a channel to feed the bottles 11 in the first direction D.

In particular, the second metering screw 14 cooperates respectively with a first barrier 23 and a second barrier 37 able to be selectively activated depending on whether container 12a or container 12b is to be loaded.

The first barrier 23 is disposed substantially aligned with the divider 17, while the second barrier 37 is disposed parallel to the divider 17.

Respective actuation means 24 are associated with the first barrier 23 and the second barrier 37 to take the latter to an active condition, containing the bottles 11 against the second worm screw 18, and a de-activated condition, retracted with respect to the support plane 25, to allow the bottles 11 to be transferred into the containers 12a, 12b by the second metering screw 14.

The actuation means 24 can comprise an electric motor, a pneumatic actuator, an electric actuator, an oil-dynamic actuator, a rack, a worm screw, articulated kinematisms or any other mean suitable for the purpose.

More specifically, the second metering screw 14 is activated until it receives "n" bottles 11 from the first metering screw 13. In this condition both the first metering screw 13 and the second metering screw 14 stop, that is, they no longer move the bottles 11 parallel to the first axis of rotation X and the second axis of rotation Y respectively. The first barrier 23 is taken to its inactive condition, freeing the bottles 11 at the front.

When the bottles 11 are free at the front, the slider 21 is moved along the guides 22 to translate the second worm screw 18 until the row of bottles 11 is positioned on the loading plane 27 of the container 12a or 12b.

Subsequently, the second metering screw 14 acquires from the first metering screw 13 "n−1" bottles 11, then again "n", "n−1", "n" etc., so that the bottles 11 of each row are positioned in the container 12a or 12b in the interstices comprised between the bottles 11 of the previous row.

Inside the containing compartment 28 of the containers 12a or 12b a mobile barrier 29 can be positioned, also selectively translatable in a direction parallel to the second direction T to keep the bottles 11 aligned also during the translation of the latter on the loading plane 27 due to the effect of the thrust of the second worm screw 18.

The mobile barrier 29 is mounted sliding on guides 30 disposed laterally to the lateral walls 26 of the container 12a or 12b, and is held in position against the first row of bottles 11 by a holding device 31.

The holding device 31, in the solution shown in FIGS. 5 and 6, comprises a counter-weight 32 connected to the mobile barrier 29 by means of cables 33 and return pulleys 34.

The holding device 31 may comprise a possible blocking member 35 to determine the positioning of the mobile barrier 29 in the container 12a or 12b, and to prevent the mobile barrier 29 from thrusting the bottles 11 out of the container 12a or 12b.

When the mobile barrier 29 reaches the bottom of the container 12a or 12b, the loading cycle of the container 12a or 12b terminates, and the mobile barrier 29 is extracted to be positioned in a new, empty container 12a or 12b, in the start-of-loading position.

The transfer apparatus 10 also comprises a command and control unit provided to suitably control and drive the first metering screw 13 and the second metering screw 14, and also the movement means 20, the actuation means 24 and the holding device 31.

The support plane 25, in the case shown in FIGS. 5 and 6, is provided for each container 12a and 12b with a positioning seating 36, lowered with respect to the plane on which the bottles 11 are transferred, so that when the container 12a or 12b is disposed on the support plane 25, the latter is substantially aligned with the loading plane 27 of the container 12a or 12b.

Figure 7:
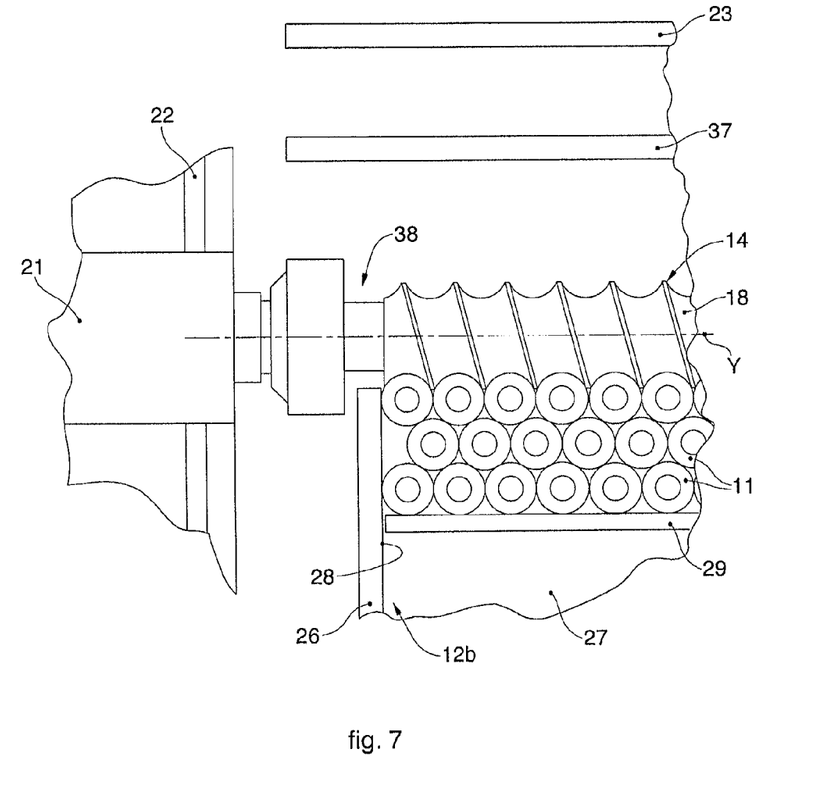
FIG. 7 is a schematic view of an enlarged detail of FIG. 4.

In some forms of embodiment (FIG. 7), it may be provided that the second worm screw 18 is provided at the ends with circumferential grooves 38 shaped mating with the lateral walls 26 of the container 12a or 12b and so as to allow the partial insertion of the latter. In this way it is possible to guarantee the complete positioning of the bottles 11 on the loading plane 27 during the translation of the second metering screw 14.

In other forms of embodiment it is also provided that the second worm screw 18 has a lateral bulk such that it enters completely inside the container 12a or 12b.

As indicated, according to a variant the second worm screw 18 itself takes the bottles 11 into position in the container 12a or 12b.

In this case the second worm screw 18 will cooperate with rotation means or with the second drive member 19, which remain connected to the second worm screw 18, for example positioned above during the loading movement.

According to a variant the rotation means or second drive member 19 will enter into temporary connection with the second worm screw 18 when the latter is in the position for receiving the bottles 11.

Figure 8:
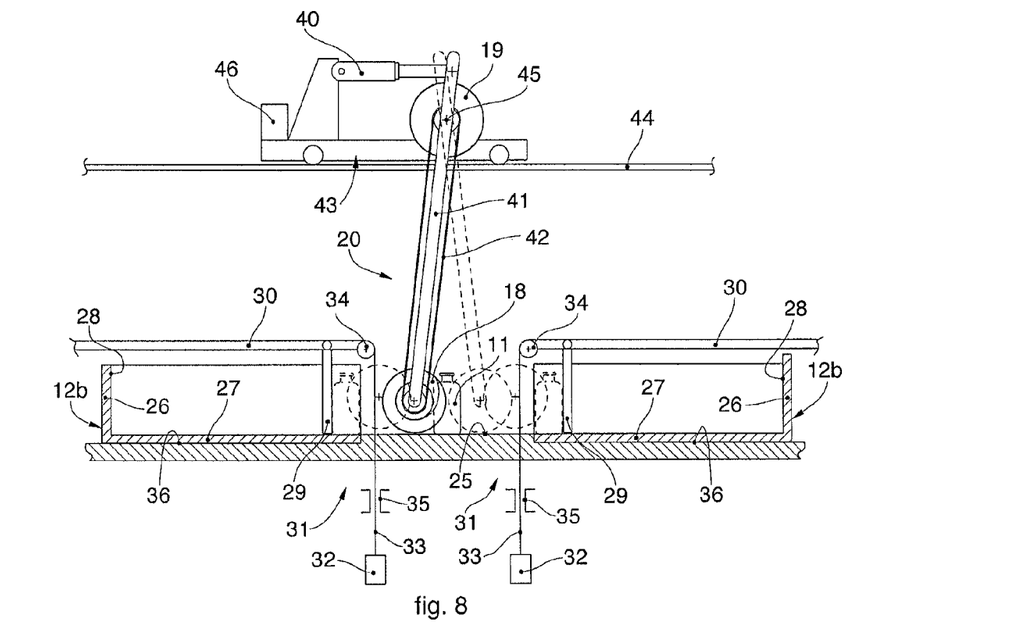
FIGS. 8 and 9 are two schematic representations of two variant forms of embodiment of FIGS. 5 and 6.
Figure 9:
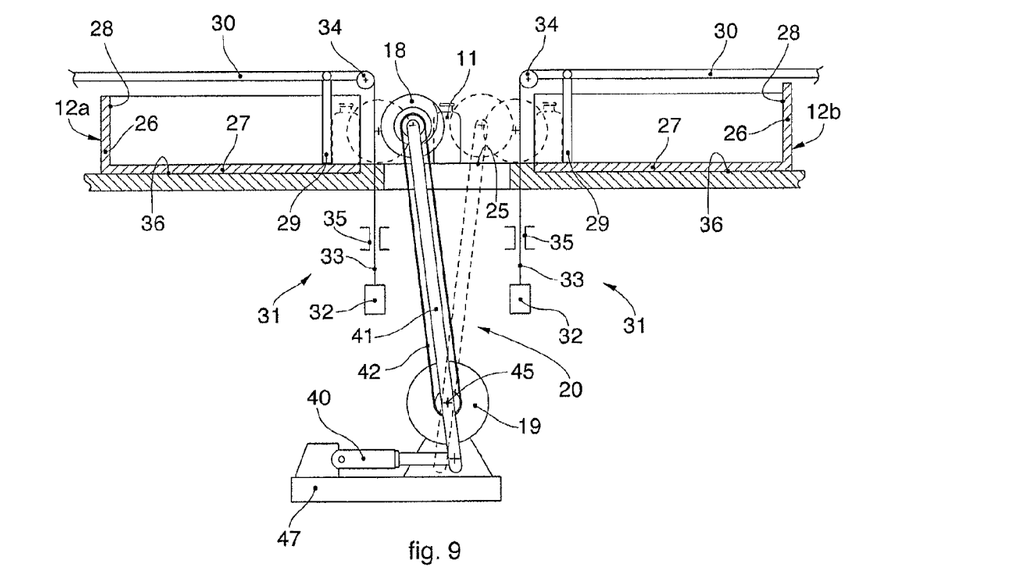

FIGS. 8 and 9 show two other forms of embodiment, in which the movement means 20, unlike what is described with reference to FIGS. 1-7, comprise at least a connection rod 41 associated with one end of the second worm screw 18 and selectively movable, by horizontal pivoting, to make the latter assume the conditions described above.

The positioning of the connection rod 41 is determined by a position adjuster 40 which can be the electric, pneumatic or oil-dynamic type.

In the forms of embodiment shown in FIGS. 8 and 9, the connection rod 41 is pivoted around a rotation pin 45 located along the longitudinal extension of the connection rod 41. The position adjuster 40 is associated with the connection rod 41, in proximity to the opposite end with respect to that where the second worm screw 18 is mounted.

The position adjuster 40 can be associated with an encoder or analogous mean to detect the position.

Depending on requirements, some forms of embodiment may provide a connection rod 41 for each of the ends of the second worm screw 18.

The second drive member 19 has its axis of rotation coaxial with the rotation pin 45, and transmits motion to the second worm screw 18 by motion transmission means 42, such as a chain, a belt, a rotary rod mechanical return with terminal conical gears, etc.

The second drive member 19 and the position adjuster 40 can be located on a mobile slider 43 (FIG. 8) sliding on longitudinal guides 44 to take the second worm screw 18 inside one or the other of the containers 12a, 12b.

The movement of the mobile slider 43 can be obtained by an actuation mean 46 associated with the mobile slider 43. Other forms of embodiment may provide that the actuation mean 46 is associated with the longitudinal guides 44 and comprises, for example, transmission means such as a belt, screw or rack, or which move the mobile slider 43 in a controlled manner.

In the form of embodiment shown in FIG. 9, a fixed anchoring base 47 is provided, on which the second drive member 19 rests and the position adjuster 40 is anchored.

In the form of embodiment in FIG. 8, the second drive member 19 and the position adjuster 40 are disposed above the support plane 25 of the bottles 11, that is, in a higher position than the second worm screw 18, while with reference to FIG. 9 it is provided that the second drive member 19 and the position adjuster 40 are disposed under the support plane 25 of the bottles 11, that is, under the second worm screw 18.

In the forms of embodiment shown in FIGS. 8 and 9 the barriers 23 and 37 are also provided, associated with the respective actuation means 24 as described above, and not shown here for ease of comprehension.

It is clear that modifications and/or additions of parts may be made to the transfer apparatus and corresponding method as described heretofore, without departing from the field and scope of the present invention.

It is also clear that, although the present invention has been described with reference to some specific examples, a person of skill in the art shall certainly be able to achieve many other equivalent forms of transfer apparatus and corresponding method, having the characteristics as set forth in the claims and hence all coming within the field of protection defined thereby.

The invention claimed is:

1. Apparatus to transfer bottles in a container comprising:
    a transfer device to transfer said bottles in a first direction, the transfer device being a metering screw, mounted in a fixed position, and provided with a first drive member to make the transfer device rotate around a first axis of rotation; and
    a pick-up and delivery member to transfer the bottles from said transfer device to said container, said pick-up and delivery member being a metering screw and being provided with a second drive member provided to make the pick-up and delivery member rotate around a second axis of rotation; and
    a movement means provided to translate said pick-up and delivery member in a second direction, transverse to said first direction, to bring said pick-up and delivery member from a first pick-up condition, in which said pick-up and delivery member is disposed consecutive to said transfer device to receive the bottles from the transfer device and the second axis of rotation is coaxial with the first axis of rotation, to a second delivery condition, in which said pick-up and delivery member is translated in the second direction with respect to the first condition toward the respective container to deliver the bottles in the container and the second axis of rotation is parallel to the first axis of rotation.

2. Transfer apparatus as in claim 1, further including at least a containing barrier, able to be selectively activated/de-activated in order to cooperate with said pick-up and delivery member and to define together with the delivery member a channel to guide a feed of the bottles in the first direction.

3. Transfer apparatus as in claim 2, wherein the metering screw of said pick-up and delivery member is a worm screw, and in that said at least one containing barrier is disposed parallel and facing said worm screw.

4. Transfer apparatus as in claim 3, wherein said worm screw has circumferential grooves mating with the lateral walls of the container.

5. Transfer apparatus as in claim 3, wherein said worm screw has a lateral length such that it enters completely inside the container.

6. Transfer apparatus as claim 2, wherein actuation means are associated to said at least one containing barrier to selectively activate/de-activate it.

7. Transfer apparatus as in claim 2, wherein said at least one containing barrier in its de-activated condition is concealed with respect to a support plane of the bottles fed by said transfer device.

8. Transfer apparatus as in claim 2, and wherein the at least one containing barrier includes a first containing barrier and a second containing barrier configured to cooperate with opposite sides of said pick-up and delivery member.

9. Transfer apparatus as in claim 1, wherein said movement means comprise guides transverse to the first direction on which a support slider for said pick-up and delivery member is mounted sliding in a controlled manner.

10. Transfer apparatus as in claim 1, wherein said pick-up and delivery member is terminally associated to at least one connection rod of said movement means, said at least one connection rod being horizontally pivoting between positions defined to move said pick-up and delivery member, and said pick-up and delivery member being drivable by a drive member associated to said connection rod in an opposite position in relation to said pick-up and delivery member.

11. Transfer apparatus as in claim 10, wherein said positions defined by said pick-up and delivery member are determined by a position regulator.

12. Transfer apparatus as in claim 10, wherein said drive member is disposed in a higher position with respect to said pick-up and delivery member.

13. Transfer apparatus as in claim 12, wherein said drive member is located on a mobile slider positionable in a controlled manner.

14. Transfer apparatus as in claim 10, wherein said drive member is located below said pick-up and delivery member.

15. Transfer apparatus as in claim 1, and further including a mobile barrier positionable inside said container and selectively translatable in said second direction in order to keep aligned, on each occasion, the bottles fed by said pick-up and delivery member, in said container.

16. Transfer apparatus as in claim 15, wherein a holding device is associated to said mobile barrier and is provided to determine, on each occasion, the position of said mobile barrier in said container.

17. Container containing bottles filled by a transfer apparatus according to claim 1, and having bottles transferred linearly in a first direction in a first step, and in a second step in which the bottles are introduced into the container, wherein said first step transfers the bottles by means of a transfer device and of a pick-up and delivery member disposed consecutive with respect to each other and both of the screw type, and in that in said second step said pick-up and delivery member translates in a second direction transverse to the first direction in order to thrust the bottles into said container, said bottles being organized in said container in alternate rows of "n" bottles and "n−1".

* * * * *